Feb. 5, 1957 L. W. DYER ET AL 2,780,788
PLUG-IN BUS DUCT STRUCTURE
Filed Feb. 19, 1954 2 Sheets-Sheet 1
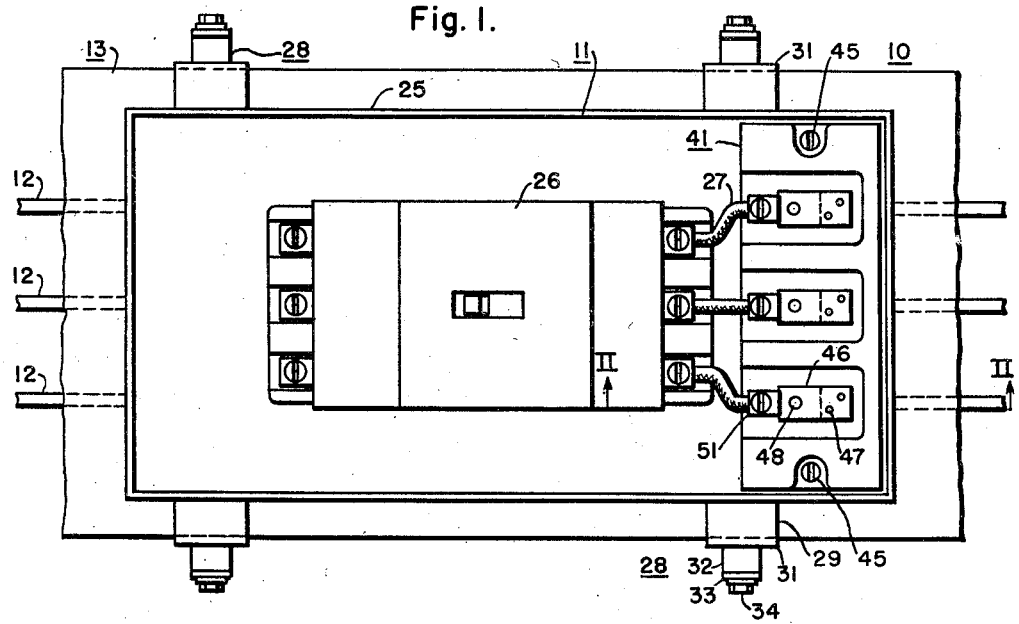
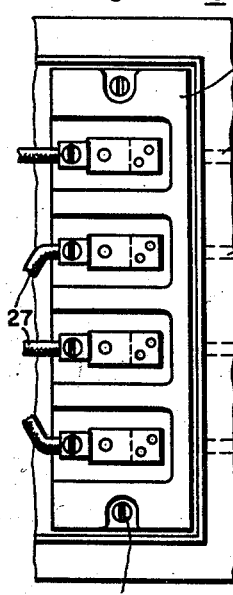
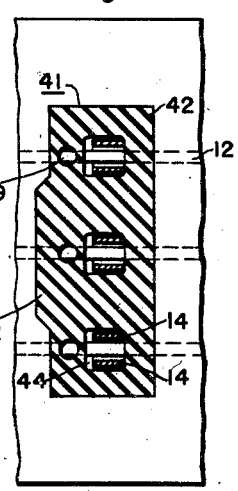
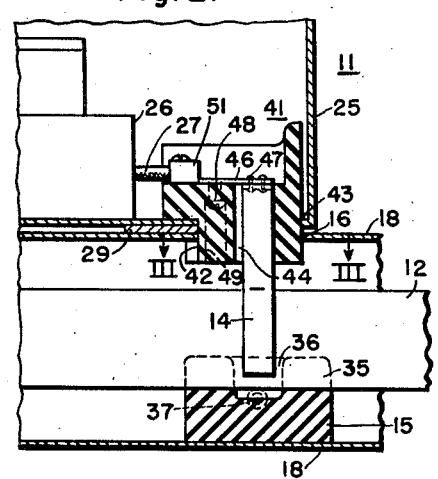
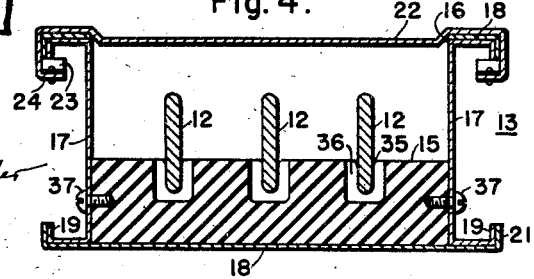
WITNESSES
Edwin E. Bassler
Wm. B. Sellers
INVENTORS
Lloyd W. Dyer &
William F. Born
BY
ATTORNEY Feb. 5, 1957 L. W. DYER ET AL 2,780,788
PLUG-IN BUS DUCT STRUCTURE
Filed Feb. 19, 1954 2 Sheets-Sheet 2

United States Patent Office 2,780,788
Patented Feb. 5, 1957

2,780,788

PLUG-IN BUS DUCT STRUCTURE

Lloyd W. Dyer and William F. Born, Beaver, Pa., assignors to Westinghouse Electric Corporation, East Pittsburgh, Pa., a corporation of Pennsylvania Application February 19, 1954, Serial No. 411,384

7 Claims. (Cl. 339—22)

Our invention relates, generally, to current distribution apparatus and, more particularly, to apparatus commonly known as plug-in bus duct in which rigid bus bars are enclosed in a generally rectangular metal housing having spaced openings therein for the attachment of current take-off devices, known as plug-in units, at desired locations.

An object of our invention, generally stated, is to provide bus duct of the plug-in type which shall be efficient in operation and which may be economically manufactured and installed.

A more specific object of our invention is to provide bus duct having increased mechanical strength, improved electrical properties, and added safety over bus duct previously manufactured.

Another object of our invention is to increase the contact pressure between the contact members or stab connectors on a plug-in unit and the bus bars in the bus duct housing which are engaged by the stabs.

A further object of our invention is to increase the mechanical support for the bus bars in the bus duct housing.

Still another object of our invention is to preclude the possibility of an arc entering a plug-in unit from the duct housing.

A still further object of our invention is to provide insulation for the contact members or stabs on a plug-in unit.

Other objects of our invention will be explained fully hereinafter or will be apparent to those skilled in the art.

In accordance with one embodiment of our invention, the bus bar supporting insulators are mounted on alternate sides of the duct housing with plug-in openings located oppositely from the insulators. An insulator in the plug-in unit is provided with openings through which the stabs extend. These openings are so proportioned that the contact pressure of the stabs on the bus bars is increased by the stabs bearing against the sides of the openings. The plug-in insulator extends into the duct housing and fills the openings for the stabs in the plug-in casing and the duct housing, thereby precluding the possibility of an arc entering the plug-in unit from the housing and also insuring that the plug-in unit is properly located on the duct housing.

For a better understanding of the nature and objects of our invention, reference may be had to the following detailed description, taken in conjunction with the accompanying drawing, in which:

Figure 1 is a view, in side elevation, of a portion of a bus duct housing and a plug-in unit embodying the principal features of our invention, the cover for the plug-in unit being removed;

Fig. 2 is a view, in section, taken along the line II—II in Fig. 1;

Fig. 3 is a view, in section, taken along the line III—III in Fig. 2;

Fig. 4 is a view, in section, taken transversely through the duct housing, the plug-in unit being removed and an outlet cover plate being installed over the plug-in opening in the duct housing;

Fig. 5 is a view, in side elevation, of a modification of the structure shown in Fig. 1;

Figure 6:
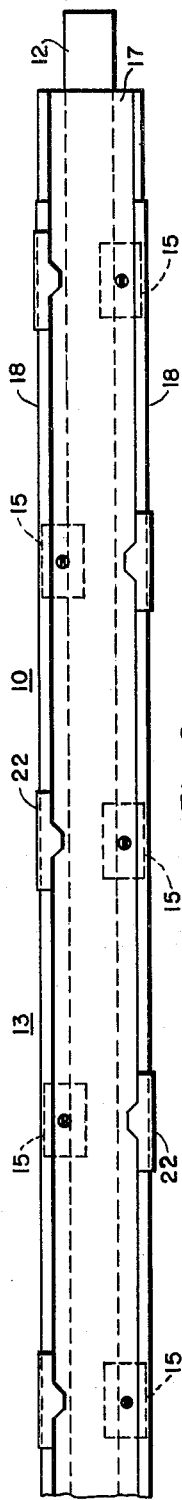
Fig. 6 is a reduced view, in plan, of part of a section of bus duct.
Figure 7:
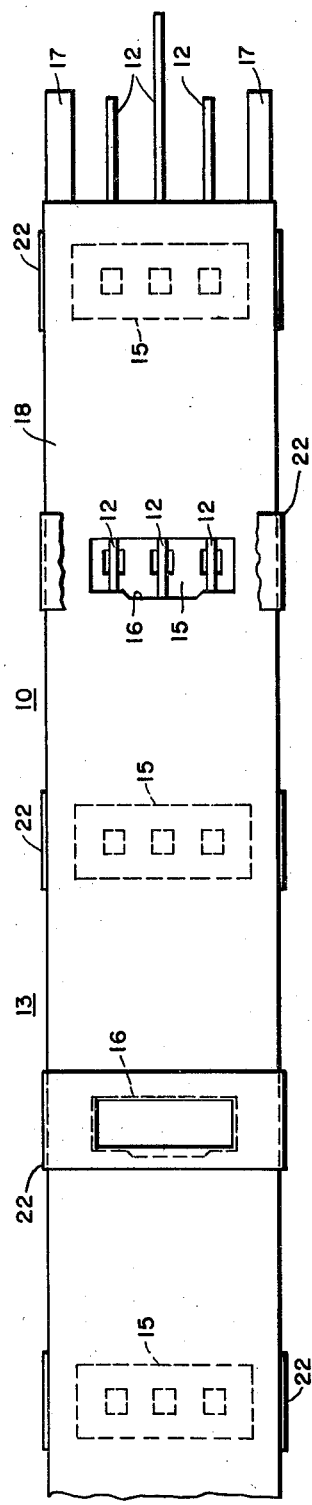
Fig. 7 is a reduced view, in side elevation, of the portion of the bus duct section shown in Fig. 6.

Referring to the drawings, and particularly to Fig. 1, the structure shown therein comprises a portion of a bus duct 10 and a plug-in unit 11 which is disposed on one side of the bus duct 10. The bus duct is of the plug-in type having a plurality of bus bars 12 which are so disposed within a metal housing 13 that they may be engaged by contact members or stab connectors 14 which extend through the bottom of the plug-in unit 11. The bus bars 12 are supported by suitable insulators 15 which are located at regular intervals on alternate sides of the bus duct, as will be explained more fully hereinafter. The bus duct housing 13 is provided with openings 16 for receiving the stab connectors 14. An opening 16 is provided opposite each insulator 15.

As shown most clearly in Fig. 4, the housing 13 comprises generally channel-shaped top and bottom walls 17 and side walls 18. The top and bottom walls 17 have inwardly extending flanges 19 which are over-lapped by flanges 21 on the side walls 18. As previously explained, the openings 16 for receiving the stab connectors 14 are located in the side walls 18 alternately on opposite sides. A cover plate 22 is provided for each opening 16 in the side walls 18. The cover plates 22 are slidably mounted on the side walls 18 and may be retained in position by leaf springs 23 which are disposed between flanges 24 on the cover plate 22 and the edges of the flanges 19 and 21 on the housing 13. As shown in Fig. 4, the cover plate 22 has a depressed portion which fits into the opening 16 in the housing 13. When it is desired to install a plug-in unit in a particular opening, the cover plate may be slid along the housing 13 to provide access to the opening 16.

The plug-in unit 11 comprises a metal casing 25 having a removable or openable cover (not shown). A circuit interrupter 26 which may be either an automatic circuit breaker or a manually operable switch is mounted inside the casing 25 and is electrically connected to the stab connectors 14 by conductors 27, thereby connecting the interrupter unit to the bus bars 12 when it is properly installed on the bus duct housing 13.

It will be understood that power conductors (not shown) may be connected to the load terminals on the interrupter unit to supply power for operating electric apparatus. In this manner the plug-in unit may be located at the most convenient position along the bus duct for supplying power to various machines or other apparatus in a factory.

As shown in Fig. 1, the plug-in unit 11 is provided with combined guide and clamping devices 28 which may be of the type described in application Serial No. 239,242, filed July 30, 1951, now Patent No. 2,725,541, issued Nov. 29, 1955 to W. F. Born and John Zipay, and assigned to the same assignee as the present application. Each clamping device 28 comprises a generally U-shaped strap 29 which is secured to the bottom of the casing 25 and has legs 31 which function as guides when the plug-in unit is being installed on the housing 13. As described in the aforesaid application, an outwardly extending projection 32 is provided on each leg 31. A clamp 33 is attached to each projection 32 by a spring which biases the clamp to its open position until a screw 34 is turned to draw the clamp closed against the flanges 19 and 31 of the housing 13, thereby holding the plug-in unit in the operating position on the duct housing.

As previously explained, the bus bars 12 are supported in the housing 13 by the insulators 15. As shown in Fig. 2, an insulator 15 is located opposite each opening 16 and is disposed between the bus bars 12 and the side walls 18 of the housing 13 opposite the opening 16. As shown in Figs. 2 and 4, each insulator is provided with a transverse groove 35 for each bus bar 12. As also shown in Figs. 2 and 4, each insulator 15 is provided with centrally disposed recesses 36 for receiving the ends of the stab connectors 14 when the bus bars 12 are relatively narrow. Thus, the stabs 14 are permitted to engage the bus bars 12 sufficiently to provide the necessary contact area between the stabs and the bus bars.

As shown in Figs. 2 and 4, each insulator 15 may be secured in the housing 13 by screws 37 which extend through the walls 17 into the insulator 15. If desired, the insulator may be secured in position by other suitable means, such as extruded punchings in the walls 17 which engage the sides of the insulator 15.

It will be seen that the mechanical strength of the bus duct structure is increased, as compared with previously built structures, by locating the insulators 15 opposite the openings 16 in such a way that the friction between the stabs 14 and the bus bars 12 pushes the bus bars toward the insulator instead of away from the insulator when the plug-in unit is installed. Thus, there is no tendency to force the bus bars 12 out of the grooves 35 in the insulators 15 when a plug-in unit is installed, as is the case when the insulator is on the same side of the bus bars as the opening 16. By having one of the insulators 15 on the opposite side of the bus bars from, and directly behind, each of the plug-in openings, there are no bending or cantilever stresses on the bus bars when the interrupter units are plugged in, as is the case where the plug-in openings are between the spaced insulators supporting the bus bars.

As shown in Figs. 2 and 3, the stab connectors 14 are supported by an insulator 41 disposed in the casing 25 of the plug-in unit 11. The insulator 41 has a reduced portion 42 which extends through an opening 43 in the bottom of the casing 25 and through the opening 16 in the side wall 19 of the bus duct housing 13. The portion 42 is generally rectangular in shape and fills the rectangular openings 16 and 43, thereby precluding the possibility of an arc entering the casing 25 from the duct housing 13.

The use of the insulator 41 having the portion 42 projecting beyond the back of the plug-in unit and into the opening 16 of the bus duct provides a safety feature in that one of the covers 22, which are slidable along the duct, cannot come in contact with, and short circuit, the stabs 14 if the cover is slid along the duct and under the end of the housing 25, as is possible without the projection 42.

The fact that the projection 42 fits closely into the opening 16 in the duct serves to accurately position the plug-in unit laterally with respect to the duct, and avoids the possibility existing in prior structures that the stabs might touch the sides of an insulator in the duct and reduce the electrical clearance to below the minimum required.

As shown more clearly in Fig. 3, the insulator 41 is provided with an opening 44 for each stab connector 14. The stab connector 14 is generally of a U-shape and the opening 44 is of such a size that the sides of the opening engage the legs of the U-shaped stab when the stab engages the bus bar 12. Thus the contact pressure between the stab and the bus bar 12 is increased by the legs of the stab bearing against the sides of the opening 44. Furthermore, proper alignment of the stabs with the bus bars is assured since the position of the stabs is maintained by the openings 44. The stabs 14 are prevented from coming in contact with the sides of the opening 16 in the duct housing 13 by the insulator 41.

As shown in Fig. 1, the insulator 41 is secured in the casing 25 by screws 45 which extend through the insulator into the bottom of the casing 25.

As shown most clearly in Figs. 1 and 2, each stab connector 14 is attached to a strap 46 by rivets 47. The strap 46 is attached to the insulator 41 by a screw 48 disposed in an opening 49 in the insulator 41. A terminal connector 51 is provided on the strap 46 for connecting the conductor 27 to the strap.

If it is desired to make the bus duct polarized so that a plug-in device can be installed in only one way, thereby insuring that proper polarity is maintained on the apparatus connected to the plug-in unit, a projection 52 (Fig. 3) may be provided on one side of the portion 42 of the insulator 41 which extends into the opening 16 on the bus duct housing 13. The opening 16 is then shaped to conform with the projection 52, thereby permitting the plug-in unit to be installed in only one position which insures that each stab connector 14 is always connected to the same bus bar 12.

The structure shown in Fig. 5 is similar to that shown in Fig. 1 with the exception that a neutral bus bar N is provided as required in a three phase four wire system. As shown, the neutral bar N is disposed above the phase bars 12. This requires a wider housing 13' but simplifies the probem of maintaining necessary electrical clearances between the neutral bar and the phase bars 12.

The plug-in unit is then provided with an insulator 41' having four openings therein for four stab connectors 14. The stab connectors are mounted on the insulator in the manner previously described. It will be understood that the insulators for supporting the bus bars are similar to the insulator 15 with the exception that grooves 35 are required in each insulator for four bus bars instead of three. This necessarily requires a longer insulator than for three bus bars.

From the foregoing description it is apparent that we have provided a bus duct structure which has increased mechanical strength and improved electrical properties as compared with structures previously built. The present structure also provides added safety over prior structures. The component parts of the structure may be readily manufactured and assembled, thereby providing a structure which may be economically manufactured.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a bus duct structure, in combination, a generally rectangular housing having a plurality of spaced openings in at least one side thereof, a plurality of bus bars disposed inside the housing longitudinally of the housing, an insulator disposed directly opposite each opening between the bus bars and the side of the housing opposite the opening, said insulators having transverse grooves in their sides for bus bars, said grooves each extending to, and being open at, the side of the insulator facing the opening in the side of the housing on the opposite side of the bus bars from said insulator whereby the bus bars and insulators may be assembled together by movement in a direction laterally of the bus bars to position the bus bars in the grooves, and a plug-in unit having stab connectors extending through one of said openings, said stab connectors engaging bus bars directly opposite one of said insulators.

2. In a bus duct structure, in combination, a housing having a plurality of spaced openings in at least one side thereof, a plurality of bus bars disposed inside the housing longitudinally of the housing, insulator means having a portion disposed directly opposite each opening between the bus bars and the side of the housing opposite the opening, said portion of the insulator means having grooves facing said opening for receiving said bus bars, a plug-in unit comprising a casing with an insulator disposed therein and having an integral portion reduced in size for extending from the casing into one of said openings in the housing, stab connectors supported by said insulator and extending through openings in said insulator into said housing beyond the confines of said insulator, said stab connectors engaging one or more of said bus bars from the side opposite the supporting portion of said insulator means, and said insulator means having recesses therein for said stab connectors.

3. In a bus duct structure, in combination, a housing having spaced openings in at least one side thereof, the openings being spaced from each other longitudinally of the housing, a plurality of bus bars disposed inside the housing, an insulator disposed directly opposite each opening between the bus bars and the side of the housing opposite the opening, each insulator having transverse grooves in its side facing said opening for receiving the bus bars, a plug-in unit having stab connectors extending through one of said openings, said stab connectors engaging said bus bars from the side opposite said insulators, said plug-in unit having a one-piece insulator therein supporting said stab connectors, said plug-in insulator having an integral portion extending beyond the back of the plug-in unit and into the housing and having openings therethrough for said stab connectors, said stab connectors extending into said housing beyond the confines of the plug-in insulator, the opening in said housing being irregular in shape, and said integral portion of the plug-in insulator conforming to said irregular shape and substantially filling said irregular opening, said stab connectors being removable from the plug-in unit with said plug-in insulator.

4. A bus duct section comprising a housing having spaced openings in at least one side thereof, the openings being offset from each other longitudinally of the housing, a plurality of bus bars disposed inside the housing, an insulator disposed directly opposite each opening between the bus bars and the side of the housing opposite the opening, each insulator having a portion with grooves in its side facing the opening for receiving the bus bars, said grooves each extending to, and being open at, the side of the insulator facing the opening in the side of the housing on the opposite side of the bus bars from said insulator whereby the bus bars and insulators may be assembled together by movement in a direction laterally of the bus bars to position the bus bars in the grooves, and fastening means engaging each insulator for retaining it in the housing.

5. In a bus duct structure, in combination, a housing having a plurality of spaced openings in at least one side thereof, a plurality of bus bars disposed inside the housing longitudinally of the housing, insulator means having a portion disposed directly opposite each opening between the bus bars and the side of the housing opposite the opening for supporting the bus bars, a plug-in unit comprising a casing with an insulator disposed therein and having an integral portion reduced in size for extending from the casing into one of said openings in the housing, contact members supported by said insulator and extending through openings in said insulator into said housing beyond the confines of said insulator and engaging one or more of said bus bars from the side opposite the supporting portion of said insulator means, and said insulator means directly counteracting the pressure applied on the bus bars when they are engaged by said contact members.

6. A bus duct plug-in unit for installation on a duct housing having an opening in one side thereof, said plug-in unit comprising a casing with a one-piece insulator disposed therein and having an integral portion reduced in size for extending from the casing into said opening when the plug-in unit is installed on the housing, a plurality of openings extending through said insulator, a contact member disposed in each of the openings in the insulator, said contact members extending into said housing beyond the confines of said insulator, and a conductor for each contact member, said conductors being supported by the insulator and electrically connected to said contact members, said contact members being removable from said casing with said insulator.

7. A bus duct plug-in unit for installation on a duct housing having bus bars disposed therein and an opening in one side thereof, said plug-in unit comprising a casing with a one-piece insulator disposed therein and having an integral portion reduced in size for extending from the casing into said opening when the plug-in unit is installed on the housing, a plurality of openings extending through said insulator, a contact member disposed in each of the openings in the insulator, said contact members extending into said housing beyond the confines of said insulator to engage the bus bars within the housing when the plug-in unit is installed on the housing, and a conductor for each contact member, said conductors being supported by the insulator and electrically connected to said contact members, said contact members being removable from said casing with said insulator.

References Cited in the file of this patent

UNITED STATES PATENTS

| | | |
|---|---|---|
| 2,124,269 | Anderson | July 19, 1938 |
| 2,161,571 | Harvey | June 6, 1939 |
| 2,192,587 | Harvey | Mar. 5, 1940 |
| 2,306,206 | Dalgleish | Dec. 22, 1942 |
| 2,306,353 | Cole et al. | Dec. 22, 1942 |
| 2,317,710 | Anderson | Apr. 27, 1943 |
| 2,318,860 | Huguelet | May 11, 1943 |
| 2,339,600 | Carlson et al. | Jan. 18, 1944 |
| 2,440,876 | Rogers | May 4, 1948 |
| 2,698,925 | Taylor | Jan. 4, 1955 |